3,428,114
METHOD AND APPARATUS FOR PREVENTING SCALE FORMATION IN HEAT EXCHANGERS
Edgar A. Cadwallader, Silver Spring, Md., and Joseph F. Revilock, Scarsdale, N.Y., assignors, by mesne assignments, to the United States of America as represented by the Secretary of the Interior
Filed Mar. 27, 1967, Ser. No. 626,676
U.S. Cl. 165—1      7 Claims
Int. Cl. F28d 21/00, 13/00

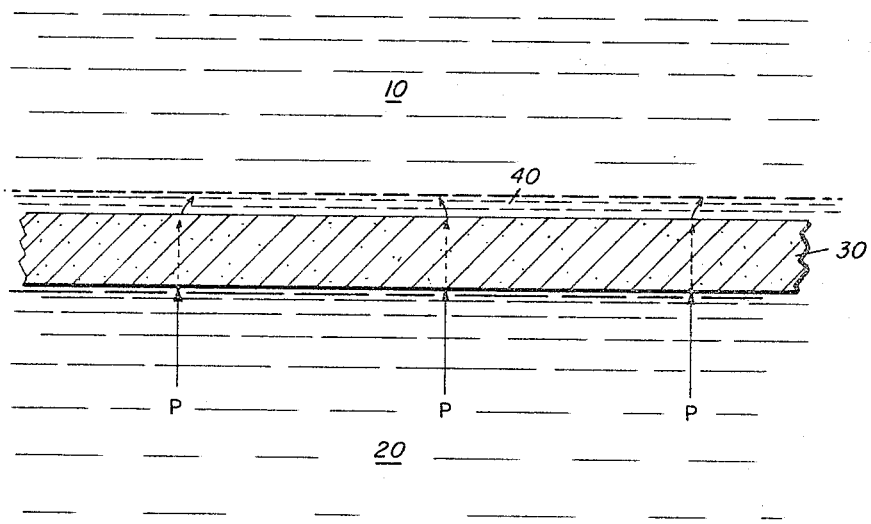
INVENTORS
EDGAR A. CADWALLADER
JOSEPH F. REVILOCK
BY Ernest S. Cohen
Robert M. Davidson United States Patent Office 3,428,114
Patented Feb. 18, 1969

ABSTRACT OF THE DISCLOSURE

The depositing of heat insulating materials on heat exchange surfaces from fluids containing the same is prevented by using porous heat exchange walls and forcing a liquid under pressure through the heat exchange wall to form a protective laminar sublayer between the wall and the liquid containing the heat insulating materials.

Background of invention

In many devices that transmit heat to or from fluids containing undesirable heat insulating components and/or fluids in which heat insulating components are formed during transmittal of heat, a portion of those heat insulating materials adhere to the surface of the heat exchange walls gradually forming a layer which greatly inhibits heat transfer.

Numerous methods designed to prevent the accumulation of heat insulating materials on heat exchanger walls have been developed. Among methods tried have been removal of heat insulating materials by precipitation or ion exchange prior to passage through the heat exchanger, addition of inhibitors to the liquid being heated, and mechanical removal of scale from heat exchange surfaces by wipers or arms. None of these processes have successfully solved the problem of scale formation and fouling on an economic scale. Thus, there remains in the art a need for a means to reduce and prevent the accumulation of heat insulating materials on heat exchange surfaces.

Objects

Accordingly, it is an object of this invention to provide a method and means of reducing the formation of heat insulating materials on heat exchanger surfaces.

Further, it is an object of this invention to prevent fouling on heat exchanger surfaces.

Still further, it is an object of the present invention to provide a method and means for preventing scaling of heat exchanger surfaces.

Further still, it is an object of this invention to provide a method and means of preventing scale formation in heat exchangers which treat saline waters.

Still other objects and advantages of this invention will become apparent from the following description of the invention.

Brief summary of invention

Briefly, the present invention comprises a method wherein the accumulation of heat insulating materials on heat exchanger walls is prevented by allowing a portion of pure liquid containing no heat insulating materials to permeate under pressure through a porous heat exchange wall and form a thin film of pure liquid on the side of the heat exchange wall which is normally exposed to liquid containing heat insulating material.

The apparatus comprises a heat insulating wall of a selected porosity one side of which is in contact with a liquid containing heat insulating material and the opposite side in contact with a liquid which does not contain heat insulating materials.

Brief description of drawing

The accompanying drawing shows a porous heat exchange member intermediate two zones, one containing a fluid having heat insulating materials and a second containing no heat insulating materials. Further, the drawing shows the existence of a laminar sublayer of fluid containing no heat insulating materials which can be formed by the operation of this invention between the heat exchange wall and the zone of fluid containing heat insulating materials.

Detailed description of invention

The present invention comprises both a method of preventing scale formation and fouling and a means for carrying out that method.

Method

The method of the present invention involves preventing the deposition from liquid of heat insulating materials on a heat exchange surface by providing a thin buffer layer of liquid containing no heat insulating materials between the heat exchanger surface and the liquid containing heat insulating materials.

Reference to the accompanying cross-sectional drawing will further explain this method. In that drawing 10 represents a liquid containing heat insulating materials. 20 represents a liquid which contains no heat insulating materials and 30 signifies the wall portion of a heat exchanger fabricated from a porous material. A thin film 40 of a liquid containing no heat insulating materials is shown positioned between liquid 10 and heat exchange member 30. This thin layer is formed by applying a pressure to liquid 20 greater than the pressure existing in liquid 30 with the difference in these pressures being great enough to force a portion of heat liquid through porous heat exchange member 30.

To identify the porosity of wall member 30, we employ the Poiseuille equation thus:

$$Q = \frac{d^2 g_c A E}{32} \frac{\Delta P}{L}$$

where:

Q = volume flow of permeating fluid cm.³/sec.
d = mean effective pore diameter, cm.
ΔP = pressure differential across porous material gram force/cm.².
$g_c$ = conversion factor,
 gram-mass × cm./gram force × cm.²
A = surface area of porous material, cm.².
E = voids, dimensionless.
32 = viscosity of permeating fluid, poises.
L = thickness of porous material, cm.

In general, it is desirable to confine permeation of nonfouling fluids to the range of from 0.00001% to 5.0% of the bulk flow rate of fouling fluid per square foot of heat exchange surface. It is apparent that various combinations of pressure differentials, porous material thicknesses and porosities will achieve the desired result. We have achieved permeations in this range when operating with pressure differentials across the porous materials from 10 mm. mercury to 6 atmospheres, absolute pressures from 5 mm. mercury to 100 p.s.i., porous material thicknesses from 0.007 inch to 0.25 inch, mean effective pore diameters in the range from 0.005 to 10 microns and voids in the range of from 0.005 to 0.20.

It will also be appreciated that this method will have wide applicability in preventing scaling and fouling in liquid-liquid heat exchangers of all types when operating with a variety of liquids. For example, the porous heat exchange surface may be tubing pipe or plate. Applications of the present method include the vaporization and concentration of a liquid solution above its saturation point on one side of the heat transmittal surface by circulating steam or hot water on the other, the heating and/or vaporization of liquids containing reverse solubility compounds on one side of the surface by steam or hot water on the other, and the condensation and cooling of a vapor from a noncondensible gas on one side of the surface using cooling water or other coolant compatible with the condensate on the other. Typical processes in which scaling and fouling of heat transfer equipment is a serious operational and capital cost factor can be found in the production of soda ash, conversion of phosphate rock to super-phosphate, and the production of boiler feed water and potable water from sea and brackish water sources.

A particularly important application is the prevention of scale in the distillation of saline water to fresh water. The scaling effects of saline waters particularly calcium sulfate scale have heretofore defied practical solution. Hydroxide scales may be partially controlled by the addition of acid, but calcium sulfate cannot be controlled in that manner. Further, calcium sulfate has reverse solubility characteristics and thereby greatly limits the operating temperature and thus the efficiency of saline distillation units. It is the ability of the present method to prevent scale formation from sea water including calcium sulfate scale formation which renders this invention particularly valuable in the field of desalination.

Apparatus

The apparatus of the present invention comprises a heat exchanger having a first zone containing a fluid material, a second zone containing a second fluid material, and a porous heat exchange wall intermediate these zones.

More particularly, this apparatus relates to a class of device known as heat interchangers wherein warm and cold fluids are brought into thermal contact on opposite sides of conduits or partitions which prevent admixture of the bulk fluids, the conduits or partitions being usually but not exclusively comprised of tubing, pipe, or plates serving for the transmittal of heat.

The present invention contemplates using a porous heat exchange wall, whereby a portion of one fluid may permeate the wall and contact the remaining fluid. This device has a number of uses among which are: to allow a measured amount of one fluid reactant to permeate through a heat exchange wall and contact a second fluid reactant while the bulk of the reactants remain in indirect heat exchange, and to prevent scale deposition on one side of the heat exchange wall by allowing a non-scaling fluid to permeate the porous heat exchange wall from the other side to form a thin layer of non-scaling fluid between the scale forming fluid and the heat exchange wall. The device has particular applicability in preventing scale formation or fouling by liquids on heat exchange surfaces.

FIG. 1 illustrates the structure of the present heat exchange device. In that figure there is shown a porous heat exchange wall 30 interposed between a scale containing liquid 10 and non-scale containing liquid 20. A differential pressure P forces a portion of liquid 20 through wall 30 to form a laminar sublayer 40 of non-scale containing liquid. The pressure of liquids 10 and 20 may be varied to enlarge liquid portion 40, to reduce or eliminate it, or to form a laminar sublayer like 40 of non-scale containing liquid. The pressure of liquids 10 and 20 may be varied to enlarge liquid portion 40, to reduce or eliminate it, or to form a laminar sublayer like 40 between liquid 20 and porous member 30.

The porosity of member 30 may be regulated in accordance with the considerations stated above to achieve the desired result.

Materials useful as porous heat exchange surfaces include, tubing, pipe and plates of bonded and molded graphite, metals, alloys, ceramics, sinters, frits, and animal, vegetable and synthetic membranes. The choice on material will depend upon the nature of the liquids in contact with the porous surface, the pressure which will be applied, the porosity required to transport a desired amount of fluid under a given pressure drop, and the heat transfer properties required.

We have found porous graphite to be a particularly useful material in scale prevention applications. Tubes and plates of porous graphite may easily be prepared by impregnating a carbonaceous agglomerate with pitch and subsequently heating to graphitizing temperatures. Still other preferred materials may be made in accordance with U.S. Patent 3,214,270 to Valyi.

When used for the purpose of preventing scale deposition in heat exchangers for fluids such as water having scale forming or fouling ingredients on one side of the heat exchange wall and water containing no scale formers on the other side of the wall it is desirable that these materials have wall thicknesses in the range of from 0.007 inch to 0.25 inch, mean effective pore diameters in the range of from 0.005 to 10 microns and voids in the range of from 0.005 to 0.20.

The following examples are set out as illustrative although not all encompassing of the present method and apparatus.

Example 1

A group of tubes 4 feet long x 2 inches O.D. and 1½ inches I.D., were prepared from a single batch of carbonaceous agglomerate, impregnated with pitch and subsequently heated to graphitizing temperatures. A portion A of the tubes was treated to imperviousness by impregnation under pressure with an air-setting liquid resin and subsequently internally sand blasted to remove surface traces of resin. The remaining portion B was "untreated" being sand blasted only to the same internal finish as the "treated" portion A.

Portion B had pore diameters ranging from 0.01 micron to 1.0 micron with 72% of the pores being in the range of 0.05 to 0.15 micron. The mean effective pore diameter was 0.112 micron and the voids were 0.0963 cubic centimeter per cubic centimeter of material.

Tubes A and B were installed in horizontal double-pipe heat interchangers and subjected to scale-forming runs. In these heat interchangers, water containing scale formers was fed through the tubes while steam was fed to the surrounding area, and condensed on the tubes.

To produce scale forming conditions within the tubes a saturated solution of calcium sulfate in the reverse solubility range was chosen as the medium to be heated with steam serving as the heating medium and condensed steam the permeating diluent. The solution was prepared at 100° F., the maximum solubility temperature of $Ca_2SO_4$, by maintaining an excess of suspended $Ca_2SO_4$.

Permeation of steam condensate was measured by two procedures (1) by change in the electrical conductivity of the solution and (2) by the volume loss in steam condensate calculated from the heat delivery to the solution over an extended period, e.g., 24 hours.

Feed rate of solution to the two sets A and B of tubes was maintained at 6.0±0.1 g.p.m. It entered at 125° F. and was heated to 160° F. by steam at 25 p.s.i.g. The mean hydrostatic pressure of the solution over the 4 ft. length of the tubes was 5.0 p.s.i.

After 24 hours of operation, the test was discontinued when the outlet temperature of the treated portion A began to decline. The graphite tubes were removed from the interchangers, cut apart longitudinally and visually inspected. The treated tubes A had a dense uniform layer of scale measuring $\%_{32}$ inch thick. The untreated tubes B had a porous coating of scale of about $\frac{1}{32}$ inch at the top and less than $\frac{1}{64}$ inch at the midpoint.

Example 2

Tests such as carried out in Example 1 were repeated with another pair of treated (A) and untreated (B) tubes at a solution flowrate of 6.0±0.1 g.p.m. but with the steam pressure reduced to 10 p.s.i.g. Under these conditions the solution was heated from an inlet temperature of 125° F. to 155° F. by metered amounts of steam. The run was continued for 24 hours at which time the tubes were cut apart longitudinally. The treated (A) tubes had a scale layer 1/16 inch thick at the top and about 3/64 inch thick at the midpoint. The untreated B tubes had neither a measurable nor continuous scale layer. About a dozen dot-shaped crystals could be seen per square inch of tube surface with the individual crystals measuring about 0.61 inch across. During this 24 hour run period while 10 p.s.i.g. steam was being used for heating, the condensate was carefully collected and measured. It amounted to 275.1 gallons which was equivalent to a steam condensate permeation loss of 0.6% per square foot of heat transfer surface.

Example 3

An untreated (B) tube was purposely fouled by sustaining a 70 hour continuous run using 6.0±0.1 g.p.m. of a solution of the type used in Example 1 with 25 p.s.i.g. steam at the heating medium. It was found that the outlet solution temperature fell to 145° F. At that time, the steam pressure was increased to 30 p.s.i.g. for 4 hours. At the conclusion of the fourth hour the temperature had risen to 154° F. The tubes were then cut apart longitudinally. There was insufficient scale present for measurement.

These examples clearly show that not only may scale be greatly reduced or eliminated under normal scale forming conditions when using the present invention but also show that scale can be removed from porous heat exchange surfaces by intermittent "shots" of permeating fluid which act to remove deposited scale.

The above examples are directly illustrative of the prime utility of the present invention, i.e., ease in reducing scale in saline water heat exchangers. However, as previously described the invention is not so limited. Various further modifications, alterations and adaptations are possible within the spirit and scope of the invention concepts which are particularly pointed out and claimed herein below.

What is claimed is:

1. In a process wherein there is an indirect transfer of heat between a first fluid containing heat insulating materials subject to deposition and a second fluid containing no heat insulating materials subject to deposition, said indirect transfer taking place when said fluids are passed in a contiguous relationship to opposite surfaces of a heat exchange wall, said wall being interposed between said first and second fluids, the improvement comprising providing a pressure on said second fluid greater than the pressure on said first fluid and utilizing as said heat exchange wall a porous material having a porosity such that under the operating differential pressure, an amount of said second fluid in the range of from about 0.00001% to 5.0% of the flowrate of said first fluid is caused to permeate through said heat exchange wall to form a thin laminar sublayer between said wall and said first fluid.

2. The process of claim 1 wherein said first fluid is a saline water.

3. The process of claim 2 wherein said second fluid is water.

4. A heat exchange apparatus comprising a porous heat exchange wall intermediate a first zone consisting of a fluid containing heat insulating materials subject to deposition and a second zone consisting of a fluid containing no heat insulating materials subject to deposition, the pressure of said second zone being greater than said first zone.

5. The apparatus of claim 4 wherein the pressure in said second zone is greater than by from 10 mm. mercury to 6 atmospheres than the pressure in said first zone, the thickness of wall is from 0.007 to 0.25 inch, the mean effective pore diameters of said wall are from 0.005 to 10 microns and the voids are from 0.005 to 0.20.

6. The apparatus of claim 5 wherein the porous wall is a carbonaceous material.

7. The apparatus of claim 6 wherein the porous wall is graphite.

References Cited

UNITED STATES PATENTS

| | | | |
|---|---|---|---|
| 2,785,878 | 3/1957 | Conrad | 165—134 |
| 3,156,298 | 11/1964 | Gardiner et al. | 165—134 |
| 3,307,616 | 3/1967 | Giger | 165—134 |
| 3,362,470 | 1/1968 | Richardson | 165—134 |

ROBERT A. O'LEARY, *Primary Examiner.*

CHARLES SUKALO, *Assistant Examiner.*

U.S. Cl. X.R.

165—104